R. C. HILTON.
AIR PUMP.
APPLICATION FILED FEB. 5, 1917.

1,363,788.

Patented Dec. 28, 1920.

Inventor.
Roland C. Hilton
by Heard Smith & Tennant.
Attys.

UNITED STATES PATENT OFFICE.

ROLAND C. HILTON, OF BOSTON, MASSACHUSETTS, ASSIGNOR TO EDGAR N. HUNT, OF READING, MASSACHUSETTS.

AIR-PUMP.

1,363,788.  Specification of Letters Patent.  Patented Dec. 28, 1920.

Application filed February 5, 1917. Serial No. 146,624.

*To all whom it may concern:*

Be it known that I, ROLAND C. HILTON, a citizen of the United States, residing at Boston, county of Suffolk, State of Massachusetts, have invented an Improvement in Air-Pumps, of which the following description, in connection with the accompanying drawing, is a specification, like characters on the drawing representing like parts.

This invention relates to air pumps and has for its object to provide a novel air pump which while capable of use generally where it is desired to pump air or similar gas, yet has particular advantages when used as an air pump for pumping up pneumatic tires.

The objects of the invention are to provide an improved pump which can be simply and inexpensively manufactured and which is so constructed as to provide the necessary tight fit between the piston and the cylinder without the use of piston rings, and which has other advantages, all as will be more fully hereinafter described.

In order to give an understanding of my invention, I have illustrated in the drawings a selected embodiment thereof which will now be described, after which the novel features will be pointed out in the appended claims.

Figure 1:
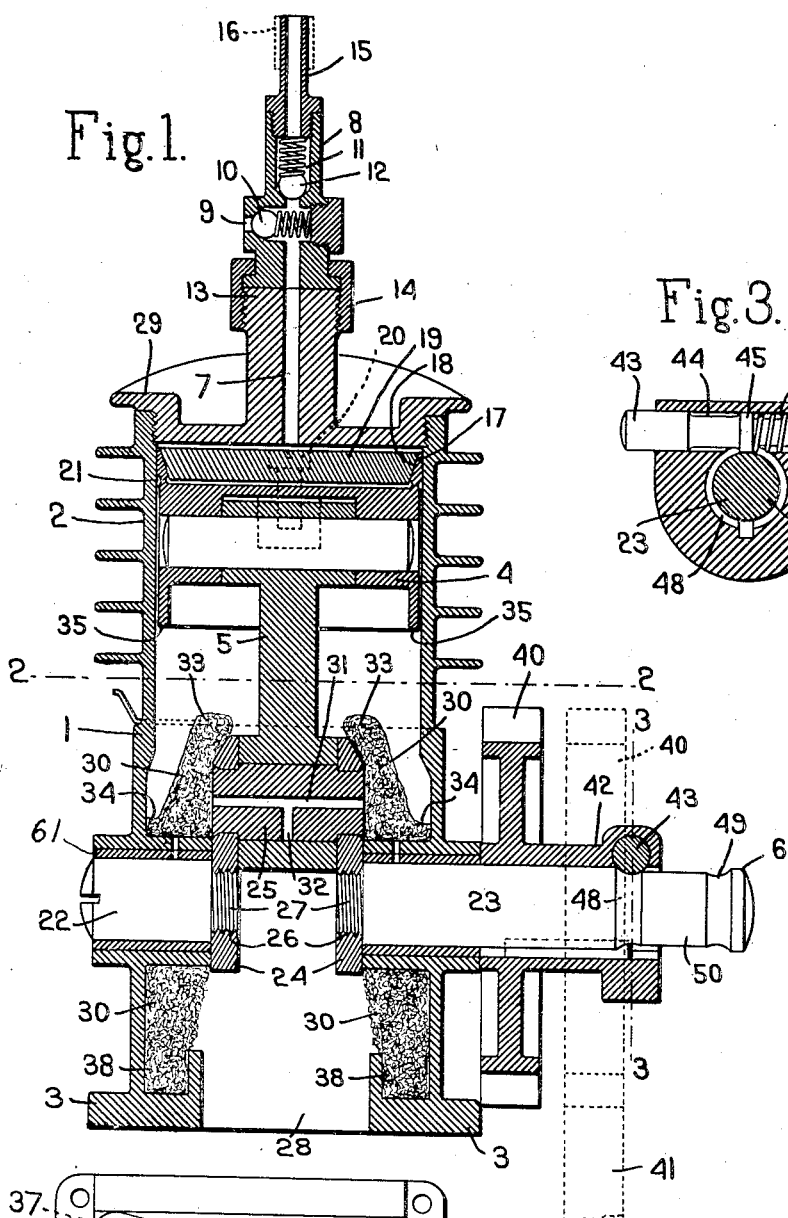
Figure 1 is a central sectional view through a pump embodying my invention.
Figure 3:
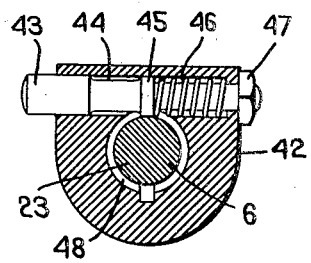
Fig. 3 is a section on the line 3—3, Fig. 1.
Figure 2:
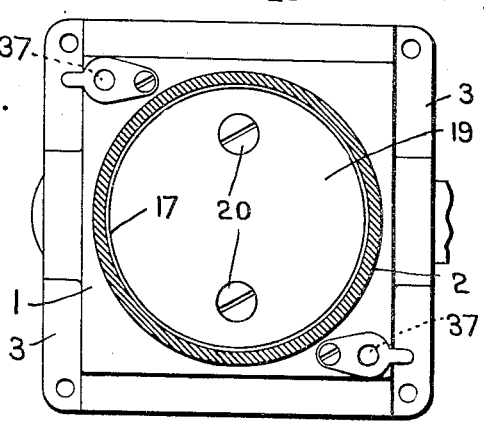
Fig. 2 is a section on the line 2—2, Fig. 1.

The pump herein shown has been especially designed to be attached to the frame or engine of an automobile and to be operated from the engine for pumping up the pneumatic tire. I wish to state, however, that the various features wherein the invention resides may be embodied in other styles of pumps than automobile pumps and that, therefore, the invention is not limited to an automobile pump. The pump herein shown comprises a pump casing 1, one end 2 of which is shaped to present the cylinder of the pump, and the other end of which is constructed with feet 3 which may be bolted or secured to any suitable support. 4 is the piston operating in the cylinder 2, said piston being connected by means of a connecting rod 5 to a driving crank shaft indicated generally at 6. The cylinder 2 is provided with a single port 7 in its end which constitutes both an inlet and an outlet port. Suitable inlet and outlet valves are provided which are sustained in a valve casing 8 that is exterior to the pump casing 1, these valves being so constructed that when the piston 4 moves downwardly on its suction stroke, the inlet valve is opened to admit air to the cylinder through the port 7, and when the piston moves upwardly on its compression stroke, the inlet valve is closed and the outlet valve is opened to permit the compressed air to be delivered to the tire or the like.

The valve casing 8 is provided with an inlet port 9 which is controlled by an inwardly-opening spring-pressed inlet valve 10, and it is also provided with an outlet port 11 which is controlled by an outwardly-opening spring-pressed outlet valve 12. This valve casing is entirely separate from the pump casing 1 and is detachably secured thereto. For this purpose the pump casing is provided with the nipple 13 through which the port 7 extends, and the valve casing 8 is detachably secured to this nipple by a suitable union 14. The valve casing is provided with a nipple 15 to which a delivery pipe 16 is secured.

One of the features of my invention relates to the construction of the piston and the means employed for maintaining a tight fit between the piston and the walls of the cylinder. The piston is formed at its working end with an annular lip or flange 17 which is integral with the piston and the exterior surface of which fits the walls of the cylinder. Means are provided for expanding the lip or flange 17 into tight fitting contact with the walls of the cylinder so as to make a tight joint. This is herein accomplished by making the interior walls 18 of the lip or flange cone-shaped and by providing a lip-expanding plug 19 which fits the walls 18 and is detachably secured to the piston 4. As herein shown, I provide screws 20 for thus clamping the plug 19 to the piston and as the screws are tightened, the action of the plug 19 is to expand the lip 17 slightly, thus to hold it in firm fitting contact with the wall of the cylinder. I will preferably make the piston with the annular peripheral groove 21 at the base of the lip 17. The purpose of this groove is to reduce the thickness of the metal at the base of the lip so as to permit said lip to have an expanding action. The lip is continuous throughout its periphery and the expansion thereof will, of course, be relatively small. By means of this construction, it is possible to maintain a perfectly tight joint between the piston and cylinder without the use of piston rings. The body of the piston 4 beneath the lip 17 will preferably be made with a loose running fit, the construction of the lip being relied upon to prevent the leakage of air past the piston during the compression stroke.

In order to simplify and cheapen the cost of manufacture, I propose to make the crank shaft of the special construction shown. It comprises the two shaft sections 22 and 23 which are journaled in the walls of the pump casing 1, and the crank section to which the connecting rod 5 is secured, the shaft sections being separable from the crank sections. The crank section comprises the two crank arms 24 and the crank pin 25 connecting the arms. These arms 24 may be readily made of pieces of the desired shape having apertures in one end to receive the crank pin, and the crank pin may be riveted or otherwise secured to the crank arms. The crank arms are provided with screw-threaded apertures 26 which are adapted to receive the screw-threaded portions 27 of the shaft sections 22 and 23.

The pump casing is formed with a removable cylinder head 29. In assembling the pump, the crank section of the crank shaft is first connected to the piston 4 and then the cylinder head 29 is removed and the connected crank section and piston are inserted into place through the end of the cylinder. The shaft sections 22 and 23 may then be inserted through the bearings in the pump casing 1 and screw-threaded into the crank arms 24. By thus making the crank shaft in sections, the cost of manufacture is greatly reduced and the assembling of the pump is facilitated.

It is, of course, necessary to keep the moving parts of the pump properly lubricated. When the pump is used as an automobile pump for pumping up tires, it is important that the system of lubrication should be such as to prevent any oil from working into the compression end of the pump because the presence of the oil in the air which is delivered to the pneumatic tire has a deleterious effect upon the tire. I have provided herein an improved oiling system which will give perfect lubrication but which will eliminate the possibility of oil being carried over into the compression end of the pump. Situated in the pump casing 1 on each side of the crank section of the crank shaft is a lubricating pad 30 of felt or similar material. Each pad 30 has such a shape and is so situated that the outer face of the crank arm 24 will have engagement therewith as the crank arm rotates. The crank pin 25 is provided with a longitudinal oil duct 31 and with a lateral port 32. The pads 30 will be saturated with oil and as the pump operates sufficient oil will work through the duct 31 and port 32 to keep the bearing between the connecting rod 5 and the crank pin thoroughly lubricated. The lubricating pads 30 surround the bearings 61 in which the shaft sections 22 and 23 are journaled and said bearings are provided with oil ducts 62 through which sufficient oil will be conducted to the shaft sections to lubricate them. These lubricating pads are shaped to present the contact surfaces 34 and the inwardly-directed upwardly-extending ears 33. The contact surfaces 34 are so positioned that the lower edge 35 of the piston will be brought into engagement therewith when the piston reaches the lower limit of its stroke and the lower edge of the piston will thus pick up a certain amount of oil from the surfaces 34 which will be deposited on cylinder walls on the up-stroke of the piston. The cylinder will thus be kept lubricated. The upwardly-extending ears 33 are so shaped and designed that they will contact with the pivotal connection between the connecting rod 5 and the piston 4 and thus sufficient oil will be deposited at this point to furnish the necessary lubrication.

The lubricating pads 30 may be kept saturated with lubricant in any suitable way. I have herein shown for this purpose oiling holes 37 through which oil may be introduced. The lower ends of the pads 30 are received in chambers or recesses 38 formed in the feet 3 of the pump casing, and any excess oil will accumulate in these recesses 38. The pads 30 are of felt or some other material which will readily absorb oil, and any oil which might accumulate in the chambers 38 will be drawn up into the pad 30 by capillary attraction. The pump casing is open at the bottom, as shown at 28, so that if surplus oil should be used, it will flow out through the opening 28, and, therefore, no excess oil can remain within the pump casing.

Where the pump is used for pumping up tires on automobiles, it is necessary to have some means for connecting the crank shaft 6 to or disconnecting it from the engine shaft or some other driving shaft. I have herein shown for this purpose a gear 40 which is splined to the shaft section 23 and which can be moved into or out of mesh with a driving gear 41 that may be connected to the engine in any suitable way. The gear 40 has rigid therewith a hub 42 in which is mounted a spring-pressed locking pin 43. This locking pin is shown as having a portion 44 of reduced diameter and a locking portion 45 of larger diameter. The locking pin is acted upon by a spring 46 which tends to hold it in operative position, and the spring-pressed movement of said pin is limited by a collar or nut 47 thereon. The shaft section 23 is provided with two grooves 48 and 49 and is cut away between the grooves, as shown at 50. When the locking pin 43 is pressed inwardly against the action of the spring 46, the portion 44 of reduced diameter is brought into line with the portion 50 of the shaft, and when the parts are in this position, the gear is free to be moved longitudinally of the shaft from one groove 48 to the other groove 49. When the gear is in either one of these positions and the locking pin is released, the spring 46 will move the locking pin to carry the portion 45 into the groove 48 or 49, thus locking the gear from longitudinal movement. In one position the gear is in mesh with the driving gear 41 and in another position it is disconnected therefrom. This construction provides a simple means for connecting the crank shaft 6 with or disconnecting it from the driving gear 41.

I claim:

1. In an air pump, the combination with a cylinder, of a piston therein having in its working end a recess provided with tapering walls and of a size to provide a relatively thin expansible annular lip at the end of the cylinder, which lip fits the cylinder walls, said piston having in its exterior an annular peripheral groove opposite the bottom of the recess whereby the wall of the recess is made thinner in the zone of said groove than immediately above the groove, thus increasing the flexibility of the lip, and a tapering plug in said recess by which the lip is expanded into close fitting engagement with the cylinder walls.

2. In an air pump, the combination with a cylinder, of a piston therein having in its working end a recess provided with tapering walls and of a size to provide a relatively thin expansible annular lip at the end of the cylinder, which lip fits the cylinder walls, said piston having in its exterior an annular peripheral groove opposite the bottom of the recess whereby the wall of the recess is made thinner in the zone of said groove than immediately above the groove, thus increasing the flexibility of the lip, and a tapering plug in said recess by which the lip is expanded into close fitting engagement with the cylinder walls, the portion of the piston below the recess being of slightly smaller diameter than the diameter of the lip portion.

In testimony whereof, I have signed my name to this specification.

ROLAND C. HILTON.